US009176281B2

(12) United States Patent
Xiao et al.

(10) Patent No.: US 9,176,281 B2
(45) Date of Patent: Nov. 3, 2015

(54) CAPILLARY WALL COUPLED WHISPERING GALLERY MODE MICRORESONATOR

(71) Applicant: The Curators of the University of Missouri, Columbia, MO (US)

(72) Inventors: Hai Xiao, Rolla, MO (US); Hanzheng Wang, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 164 days.

(21) Appl. No.: 13/867,748

(22) Filed: Apr. 22, 2013

(65) Prior Publication Data

US 2014/0314375 A1    Oct. 23, 2014

(51) Int. Cl.
*G02B 6/26*  (2006.01)
*G02B 6/42*  (2006.01)
*G02B 6/293* (2006.01)

(52) U.S. Cl.
CPC ....... *G02B 6/29341* (2013.01); *Y10T 29/49815* (2015.01); *Y10T 29/49826* (2015.01)

(58) Field of Classification Search
CPC ............................ G02B 6/305; G02B 6/29341
USPC ........................................................ 385/43
See application file for complete search history.

(56) References Cited

U.S. PATENT DOCUMENTS

| | | | |
|---|---|---|---|
| 2005/0265658 A1* | 12/2005 | Fan et al. | 385/43 |
| 2007/0109550 A1* | 5/2007 | Ja et al. | 356/480 |
| 2008/0265147 A1* | 10/2008 | Fan et al. | 250/227.24 |
| 2012/0230641 A1* | 9/2012 | Donlagic | 385/127 |

OTHER PUBLICATIONS

Wang et al., "Optical microresonator based on hollow sphere with porous wall for chemical sensing," Optical Letters, vol. 37, No. 1, Jan. 1, 2012, pp. 94-96.
Wang, Hanzheng, "Novel Optical Microresonators for Sensing Applications," Jan. 1, 2014, Clemson University Dissertation, 112 pages, tigerprints.clemson.edu.
Wang et al., "Fiber pigtailed thin wall capillary coupler for excitation of microsphere WGM resonator," Optics Express, vol. 21, No. 13, Jul. 1, 2013, 15834-9.

* cited by examiner

*Primary Examiner* — Jerry Blevins
(74) *Attorney, Agent, or Firm* — Hovey Williams LLP

(57) ABSTRACT

A microresonator structure comprises a waveguide and a microsphere. The waveguide is of elongated cylindrical shape and includes a first section of optical transmission material and a cavity section axially aligned with the first section. The cavity section includes a first cavity and a second cavity. The first cavity is adjacent to the first section and includes a first sidewall of optical transmission material with an inner surface that tapers inward to an apex positioned adjacent to the first section. The second cavity is positioned adjacent to the first cavity of hollow cylindrical shape and includes a circumferential second sidewall of optical transmission material that abuts the first sidewall. The microsphere has a spherical outer surface and is positioned within the cavity section such that the outer surface contacts a portion of the first sidewall and a portion of the second sidewall.

20 Claims, 4 Drawing Sheets

CAPILLARY WALL COUPLED WHISPERING GALLERY MODE MICRORESONATOR

BACKGROUND OF THE INVENTION

1. Field of the Invention

Embodiments of the current invention relate to microresonator structures.

2. Description of the Related Art

Microspheres are small spherical objects constructed from optical transmission material. Typically, microspheres have a diameter on the order of 10-100 micrometers. Within a concave or arcuate shaped inner surface, such as the interior of a microsphere, waves traveling along the surface decay much less than waves traveling in other directions and are known as whispering gallery waves. When light is coupled into a microsphere at an appropriate incidence angle, the light becomes whispering gallery waves that resonate within the microsphere. Microspheres that are excited with whispering gallery resonant waves may be utilized in sensing and lasing applications. However, coupling the light into the microsphere to excite whispering gallery waves in a robust and cost-effective package can be difficult.

SUMMARY OF THE INVENTION

Embodiments of the current invention provide a distinct advance in the art of microresonator structures.

A first embodiment of the current invention provides a microresonator structure comprising a waveguide and a microsphere. The waveguide is of elongated cylindrical shape and includes a first section of optical transmission material and a cavity section axially aligned with the first section. The cavity section includes a first cavity and a second cavity. The first cavity is adjacent to the first section and includes a first sidewall of optical transmission material with an inner surface that tapers inward to an apex positioned adjacent to the first section. The second cavity is positioned adjacent to the first cavity of hollow cylindrical shape and includes a circumferential second sidewall of optical transmission material that abuts the first sidewall. The microsphere has a spherical outer surface and is positioned within the cavity section such that the outer surface contacts a portion of the first sidewall and a portion of the second sidewall. A portion of the light coupled into the first section of the waveguide is coupled into the microsphere where the microsphere contacts the waveguide.

A second embodiment of the current invention provides a microresonator structure comprising a waveguide and a microsphere. The waveguide includes a first optical fiber and a capillary. The first optical fiber includes a central core and surrounding cladding. The capillary is constructed from optical transmission material and is coupled to the first optical fiber. The capillary forms a cavity section including a first cavity and a second cavity. The first cavity is positioned adjacent to the first optical fiber and includes a first sidewall with an inner surface that tapers inward to an apex positioned adjacent to the first optical fiber. The second cavity is positioned adjacent to the first cavity of hollow cylindrical shape and includes a circumferential second sidewall that abuts the first sidewall. A portion of the light coupled into the first optical fiber is coupled into the microsphere where the microsphere contacts the waveguide.

A third embodiment of the current invention provides a method of forming a microresonator structure. The method comprises the steps of: coupling a first end of a hollow cylindrical capillary to a first optical fiber, forming an inwardly tapering inner surface of a sidewall of the capillary, placing a microsphere in the capillary so that the microsphere contacts the inner surface, sealing a second end of the capillary with a second optical fiber, and reducing the thickness of the sidewall of the capillary.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 1:
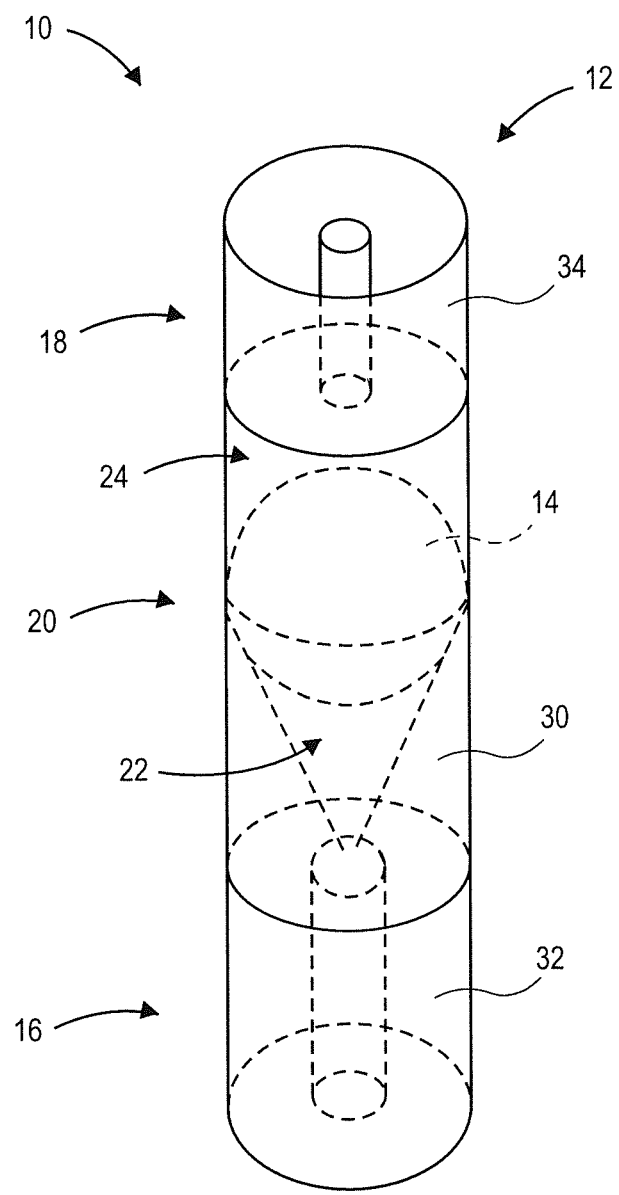
FIG. 1 is a perspective view of a microresonator structure including a first section, a second section, and a cavity section constructed in accordance with various embodiments of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

A microresonator structure 10 constructed in accordance with a first embodiment of the current invention is shown in FIGS. 1-4. The microresonator structure 10 may be utilized for sensing and lasing. The microresonator structure 10 may broadly comprise a waveguide 12 and a microsphere 14.

Figure 2:
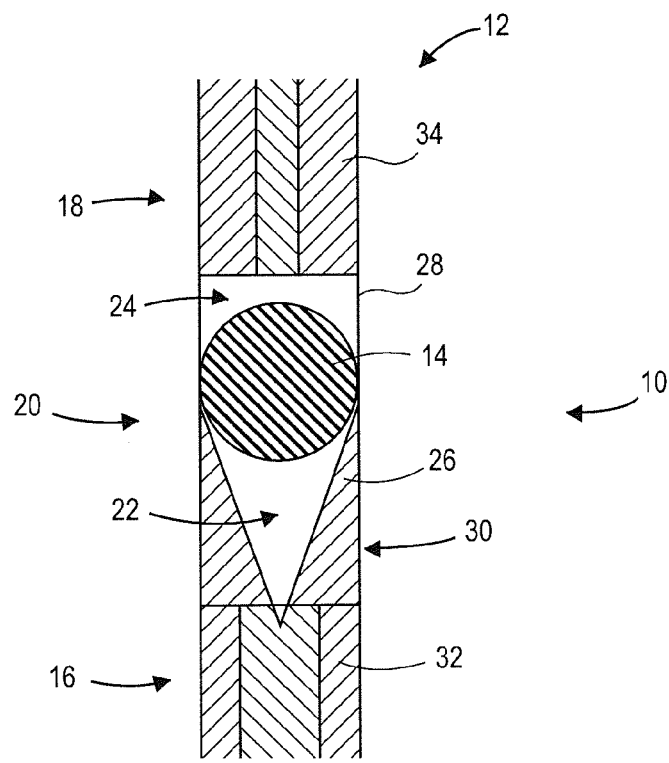
FIG. 2 is a sectional view of a portion of the microresonator structure cut along a central axis thereof.
Figure 3:
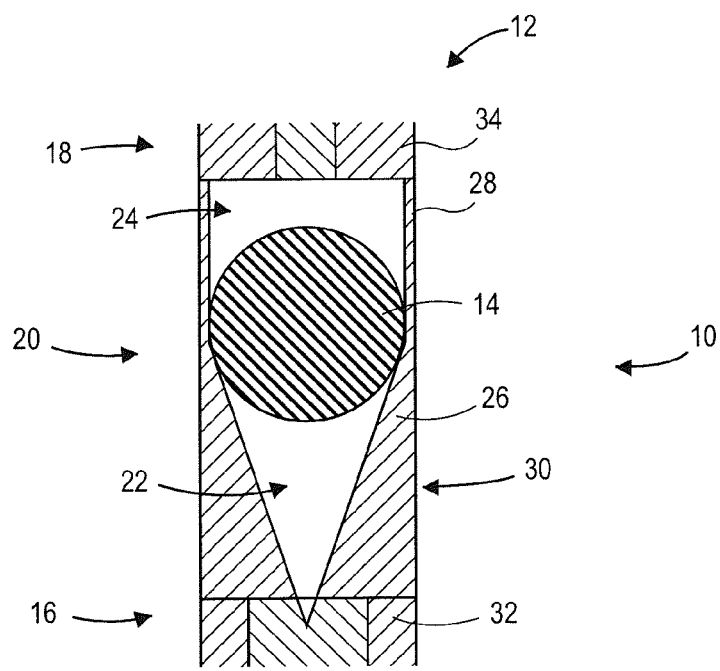
FIG. 3 is an enlarged sectional view of the microresonator structure from FIG. 2 focusing on the cavity section.

The waveguide 12, as seen in FIGS. 1-4, generally guides wave of electromagnetic radiation considered to be light and may include optical waveguides or optical transmission media. The waveguide 12 may have an elongated cylindrical shape with a first section 16, a second section 18, and a cavity section 20—all axially aligned. The first section 16 and the second section 18 may be axially separated, and each may include an optical fiber central core and surrounding cladding. The cavity section 20 may be positioned between the first and second sections 16, 18 and may include a first cavity 22 and a second cavity 24. The first cavity 22 may be positioned adjacent to the first section 16 and may include a first sidewall 26 that has an inner surface which tapers inward to an apex or point. The apex may be positioned adjacent to the first section 16. In some embodiments, the inner surface of the first sidewall 26 may have a conical or cone-like shape. In other embodiments, the inner surface of the first sidewall 26 may have an outward curvature. The second cavity 24 may be positioned between the first cavity 22 and the second section 18 and may include a second sidewall 28 that abuts the first sidewall 26 and may be of hollow cylindrical shape with a circumferential second sidewall 28. The second sidewall 28 may include an inner surface and an outer surface with a thickness therebetween, as best seen in FIG. 3.

An exemplary waveguide 12 may be constructed from a capillary 30, a first optical fiber 32, and a second optical fiber 34. The capillary 30 may form the cavity section 20 of the waveguide 12, while the first optical fiber 32 may form the first section 16, and the second optical fiber 34 may form the second section 18. The capillary 30 may be constructed from flexible fused silica capillary tubing (FFSCT) and may be of elongated hollow cylindrical shape including a circumferential sidewall with an inner diameter of approximately 75 micrometers ($\mu m$) and an outer diameter of approximately 150 $\mu m$. The FFSCT material may be synthetic fused silica with a standard polyimide coating and may be provided by Polymicro Technologies of Phoenix, Ariz. The capillary 30 may have an exemplary length ranging from approximately 200 $\mu m$ to approximately 2 millimeters (mm).

The first optical fiber 32 may be an optical fiber that includes at least a core and a cladding, as are known in the art. An exemplary first optical fiber 32 may be a multi-mode fiber, such as an MMF-62.5/125 fiber, from Corning, Inc. of Corning, N.Y., with a core diameter of approximately 62.5 $\mu m$ and a cladding diameter of approximately 125 $\mu m$. The first optical fiber 32 may have an exemplary length of approximately 1 meter (m).

The second optical fiber 34 generally provides a cap for the microresonator structure 10 and protection for the microsphere 14 during the etching process, as described in more detail below. The second optical fiber 34 may be any type of optical fiber that includes at least a core and a cladding, as are known in the art. One consideration for choosing a second optical fiber 34 may be the outer diameter of the fiber. The second optical fiber 34 should have an outer diameter that is close to the outer diameter of the capillary 30. An exemplary second optical fiber 34 may be an SMF-28 fiber, from Corning, Inc. of Corning, N.Y., with a core diameter of approximately 8.2 $\mu m$ and a cladding diameter of approximately 125 $\mu m$. The second optical fiber 34 may have an exemplary length of approximately 5 mm.

The waveguide 12 may be constructed by joining the capillary 30 with the first optical fiber 32 and the second optical fiber 34. To start, a first end of the capillary 30 may be fusion spliced to a first end of the first optical fiber 32. An optical fiber splicing machine or fusion splicer, such as the T36 from Sumitomo Corporation of Tokyo, Japan, may be utilized for the fusion splicing. Exemplary settings of the fusion splicer are as follows. The arc duration is approximately 4.5 seconds, the prefusion is approximately 0.1 seconds, the arc gap is approximately 10 $\mu m$, the overlap is approximately 15 $\mu m$, and the arc power is approximately 0015. The use of the fusion splicer with settings such as these creates an inward taper of the interior of the capillary 30 at the interface with the first optical fiber 32, which forms the first sidewall 26 of the cavity section 20. The inner surface of the first sidewall 26 may thus have a conical or cone-like shape or may have a slight outward curvature. In some embodiments, the fusion splicing process may cause an opening in the end of the first optical fiber 32, as shown in FIGS. 2-3. Thus, a portion of the first cavity 22 and a portion of the first sidewall 26 may exist in the first optical fiber 32, particularly in the central core of the first optical fiber 32.

After insertion of the microsphere 14 into the capillary 30 as described in more detail below, the second end of the capillary 30 may be solder sealed with a first end of the second optical fiber 34. The fusion splicer, mentioned above, may be utilized to perform the solder seal. Exemplary settings of the fusion splicer are as follows. The arc duration is approximately 0.6 seconds, the prefusion is approximately 0.1 seconds, the arc gap is approximately 10 $\mu m$, the overlap is approximately 13 $\mu m$, and the arc power is approximately 0008. With these settings, a flat interface between the capillary 30 and the second optical fiber 34 may be created.

The microsphere 14 generally has a spherical outer surface. In some embodiments, the microsphere 14 may be solid and may be constructed from glass, more specifically, a chemically stable borosilicate glass material. An exemplary microsphere 14 may be provided by Mo-Sci Corporation of Rolla, Mo. The diameter of the solid microsphere 14 may depend on the inner diameter of the first sidewall 26 of the first cavity 22. For a first sidewall 26 inner diameter of approximately 100 $\mu m$, the diameter of the microsphere 14 may range from approximately 85 $\mu m$ to approximately 95 $\mu m$. For a first sidewall 26 inner diameter of approximately 75 $\mu m$, the diameter of the microsphere 14 may range from approximately 60 $\mu m$ to approximately 70 $\mu m$. In other embodiments, the microsphere 14 may have a hollow core with a porous spherical sidewall. The microsphere 14 may be known as a porous wall hollow glass microsphere (PW-HGM) and may be constructed from the same glass material as the solid microsphere 14. The diameter of the PW-HGM may range from approximately 10 $\mu m$ to approximately 100 $\mu m$ with a wall thickness ranging from approximately 0.5 $\mu m$ to approximately 2 $\mu m$ and a pore opening size ranging from approximately 20 nanometers (nm) to approximately 200 nm.

In the waveguide 12 construction process discussed above, before the capillary 30 is joined to the second optical fiber 34, the microsphere 14 may be inserted into the second end of the capillary 30 and thus positioned in the cavity section 20 of the waveguide 12. In general, the diameter of the microsphere 14 may be approximately 0.85-0.95 times the inner diameter of the second sidewall 28. In such cases, the outer surface of the microsphere 14 may contact a portion of the second sidewall 28 and a portion of the first sidewall 26. Contact between the outer surface and the second sidewall 28 may occur near the circumference of the microsphere 14. The points of contact between the microsphere 14 and the waveguide 12 create an optical coupling interface such that light may pass from the waveguide 12 to the microsphere 14 and vice versa.

After the microsphere 14 has been placed in the capillary 30 and the second end sealed with the second optical fiber 34, an etching process may be performed in order to thin the wall of the capillary 30, which forms the second sidewall 28 of the second cavity 24 of the cavity section 20. For example, the waveguide 12 may be exposed to a hydrofluoric (HF) acid solution with a 50% concentration for approximately 10 minutes followed by exposure to a 10% concentration HF solution for approximately 10 minutes. The goal of the etching is to reduce the thickness of the capillary 30 wall (the second sidewall 28) to a range from approximately 2 μm to approximately 4 μm. The thinning of the second sidewall 28 narrows the optical pathway through the cavity section 20 so that more of an evanescent wave from the waveguide 12 may couple to the microsphere 14.

In some embodiments, after the etching process is complete, the second optical fiber 34, which forms the second section 18 of the waveguide 12, may be removed (by cleaving) in order for the microsphere 14 to be exposed to the surrounding environment for sensing applications. In other embodiments, the second section 18 may remain intact when the microresonator structure 10 is used in lasing applications.

Figure 5:
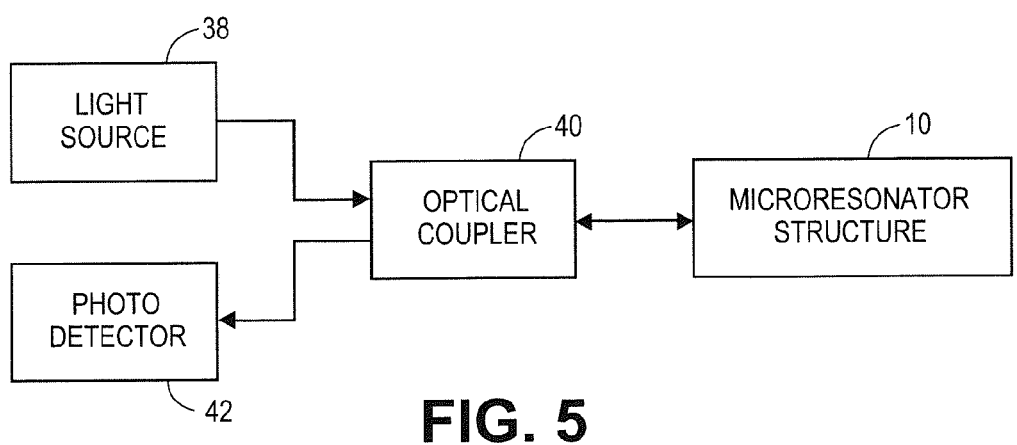
FIG. 5 is a schematic block diagram of an application using the microresonator structure.

The microresonator structure 10 may function as follows. For certain applications and uses of the microresonator structure 10, various components or pieces of equipment, such as those shown in FIG. 5, may be utilized. Light, forming a transmission light wave 36, may be coupled into the second section 18 of the waveguide 12 from a light source 38. The light source 38 may be a laser light source, including a tunable laser source, such as the HP 8168F laser source from Agilent Technologies, Inc. of Santa Clara, Calif. In at least one embodiment, the wavelength of the light may range from approximately 1200 nm to approximately 1600 nm, more particularly from approximately 1450 nm to approximately 1590 nm, although other ranges are possible. The transmission light wave 36 may be coupled using an optical coupler 40, such as a 50/50 split ratio multi mode fiber coupler.

Figure 4:
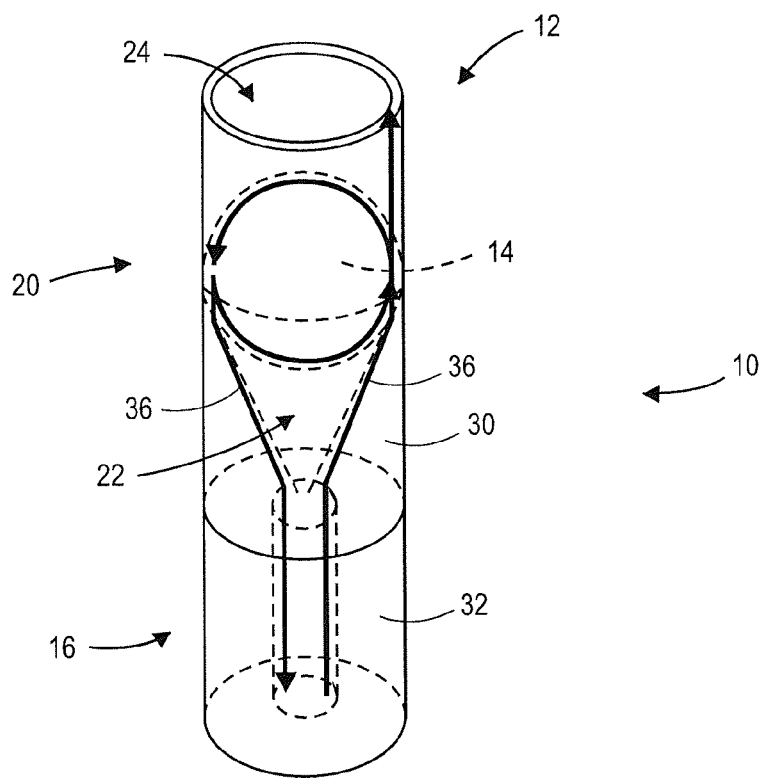
FIG. 4 is a perspective view of the microresonator structure without the second section, highlighting the path of a light wave.

With reference to FIG. 4, the transmission light wave 36 may travel through the second section 18 of the waveguide 12. At the cavity section 20, the light wave 36 encounters the second cavity 24 and travels along the optical pathway through the second sidewall 28 until it reaches the points where the first sidewall 26 and the second sidewall 28 contact the microsphere 14. At least of a portion of the light wave 36 may couple from the waveguide 12 into the microsphere 14 at such a shallow incidence angle with respect to the outer surface of the microsphere 14 so that the light becomes whispering gallery waves which resonate within the microsphere 14. The light wave 36 may couple into the microsphere 14 along a 360 degree path. Therefore, multiple paths of whispering gallery waves are excited in different directions. At least a portion of the light may also exit the microsphere 14, couple into the waveguide 12, and travel back through the second section 18 of the waveguide 12. The light exiting the waveguide 12 may be detected and measured using a photo detector 42. Light that does not couple into the microsphere 14 may be reflect from the interface of the capillary 30 and the second optical fiber 34 back through the waveguide 12, or may be transmitted into free space if the second optical fiber 34 has been removed.

When used in certain applications, some property or parameter of the light returned from the microresonator structure 10 may differ from the light transmitted to the microresonator structure 10. For example, the microresonator structure 10 may be used to sense temperature. For such an application, the microsphere 14 may optionally be coated with a thin polymer layer, and the microresonator structure 10 may be placed in the target environment in which the temperature is to be sensed. Using a setup similar to that of FIG. 5, light may be coupled into the microresonator structure 10 at a first wavelength, while the light from the microresonator structure 10 may return at a second wavelength that is shifted from the first wavelength based on the temperature of the target environment. As an example, the second wavelength may be less than the first wavelength by a fixed amount for every degree Celsius of temperature.

The microresonator structure 10 may also be used to sense the presence of certain chemicals or chemical compounds. For such an application, the porous microsphere 14 may be utilized. In addition, the second optical fiber 34 may be removed from the waveguide 12. The microresonator structure 10 may be placed in the target environment in which chemicals are to be sensed. The microresonator structure 10 may be accompanied by components such as those in FIG. 5. In a similar fashion to the temperature sensing, in the presence of certain chemicals, the second wavelength of the light exiting the microresonator structure 10 may be shifted from the first wavelength of the light that was coupled into the microresonator structure 10. Based on the amount of the wavelength shift, the type of chemical can be determined. For example, a first chemical may shift the wavelength of light by a first amount, while a second chemical may shift the wavelength by a second amount.

The microresonator structure 10 may also be used to create a laser source. The microsphere 14 may be optionally doped with rare earth elements, such as erbium, ytterbium, and the like. An external laser source producing, as an example, a 980 nm laser beam may act as a laser pump. The external laser source may be positioned on the side of, or generally proximal to, the microresonator structure 10 so that the laser beam from the external laser source may be directed at the microsphere 14 and may excite whispering gallery waves therein. The waves may couple from the microsphere 14 into the waveguide 12 and exit from the first section 16. The microresonator structure 10 may be coupled with various optical components, such as an isolator and a polarization controller, to process the laser beam emanating from the microresonator structure 10.

Figure 6:
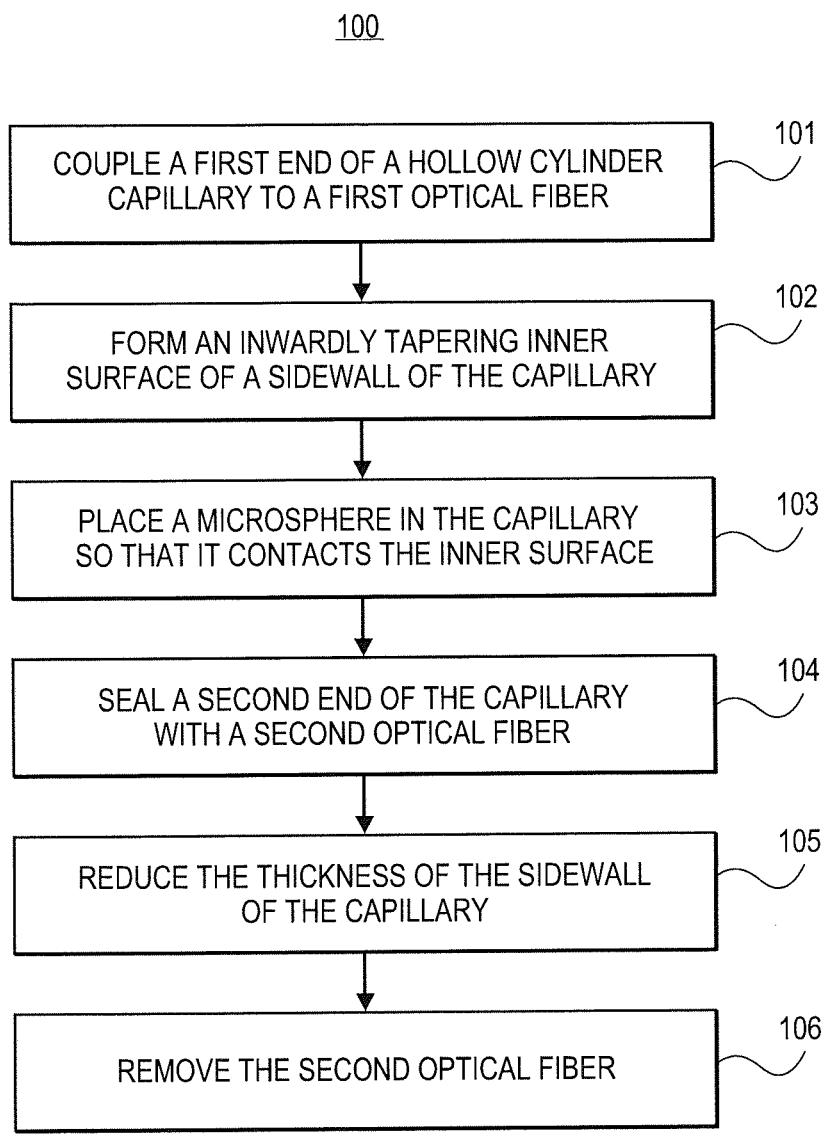
FIG. 6 is a flow diagram of a portion of the steps of a method of forming a microresonator structure.

At least a portion of the steps of a method 100 for forming a microresonator structure 10 in accordance with various embodiments of the present invention are illustrated in FIG. 6. The steps may be performed in the order shown in FIG. 6, or they may be performed in a different order. Furthermore, some steps may be performed concurrently as opposed to sequentially. In addition, some steps may be optional.

Referring to step 101, a first end of a capillary 30 is coupled to a first optical fiber 32. The capillary 30 may be of hollow cylindrical shape with a circumferential sidewall and may form a cavity section 20 of a waveguide 12. The first optical fiber 32 may form a first section 16 of the waveguide 12 and may have a central core and surrounding cladding. In various embodiments, the first optical fiber 32 is a multi-mode fiber. The first end of the capillary 30 may be fusion spliced to the first optical fiber 32.

Referring to step 102, an inner surface of the sidewall of the capillary 30 is formed with an inward taper. The sidewall may taper inwardly to an apex that is positioned adjacent to the first optical fiber 32. The inwardly tapered sidewall may form a first sidewall 26 of the cavity section 20. The inward taper may have a conical or near conical shape. The inward taper may be formed as the result of specific settings of the fusion splicing process of step 101.

Referring to step 103, a microsphere 14 is placed in the capillary 30 so that it touches the inner surface of the sidewall. The microsphere 14 may have a diameter that is slightly less than the inner diameter of the capillary 30 cylindrical sidewall, which forms a second sidewall 28 of the cavity section 20, and may contact the inner surface of both the first sidewall 26 and the second sidewall 28. Frictional forces may hold the microsphere 14 in place.

Referring to step 104, a second end of the capillary 30 is sealed with a second optical fiber 34. The seal may be a solder seal performed with an optical fiber splicing machine. The second optical fiber 34 may be any type of fiber with a core and cladding. An exemplary second optical fiber 34 is a single mode fiber.

Referring to step 105, the thickness of the sidewall of the capillary 30 is reduced. The capillary 30, the first optical fiber 32, and the second optical fiber 34 may be exposed to an etching solution, such as hydrofluoric acid. By controlling the exposure time and the etching concentration, the second sidewall 28 can be etched to a thickness ranging from approximately 2 µm to approximately 4 µm.

Referring to step 106, the second optical fiber 34 is removed. This is an optional step and may be performed by cleaving the second optical fiber from the capillary 30.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A microresonator structure comprising:
   a waveguide of elongated cylindrical shape including a first section of optical transmission material and a cavity section axially aligned with the first section, the cavity section including a first hollow cavity adjacent to the first section including a first sidewall of optical transmission material with an inner surface that tapers inward to an apex positioned adjacent to the first section and a second hollow cavity positioned adjacent to the first cavity of cylindrical shape including a circumferential second sidewall of optical transmission material that abuts the first sidewall; and
   a microsphere with a spherical outer surface, the microsphere positioned within the cavity section such that the outer surface contacts a portion of the first sidewall and a portion of the second sidewall,
   wherein a portion of light coupled into the first section of the waveguide is coupled into the microsphere where the microsphere contacts the waveguide.

2. The microresonator structure of claim 1, wherein the inner surface of the first sidewall has a conical shape.

3. The microresonator structure of claim 1, wherein the inner surface of the first sidewall has an outwardly curved shape.

4. The microresonator structure of claim 1, wherein the microsphere has a diameter ranging from approximately 0.85 to approximately 0.95 times an inner diameter of the second sidewall.

5. The microresonator structure of claim 1, wherein the microsphere is constructed from solid material.

6. The microresonator structure of claim 1, wherein the microsphere includes a hollow core with a spherical sidewall constructed from porous material.

7. The microresonator structure of claim 1, wherein the first section includes an optical fiber with a central core and surrounding cladding.

8. The microresonator structure of claim 1, wherein the first section includes a multi-mode fiber.

9. The microresonator structure of claim 1, wherein the waveguide further includes a second section coupled with the cavity section adjacent to the second cavity.

10. The microresonator structure of claim 9, wherein the second section includes an optical fiber with a central core and surrounding cladding.

11. A microresonator structure comprising:
    a waveguide of elongated cylindrical shape including:
        a first optical fiber including a central core and surrounding cladding, and
        a capillary of optical transmission material coupled to the first optical fiber, the capillary forming a cavity section including a first hollow cavity adjacent to the first optical fiber including a first sidewall with an inner surface that tapers inward to an apex positioned adjacent to the first optical fiber and a second hollow cavity positioned adjacent to the first cavity of cylindrical shape including a circumferential second sidewall that abuts the first sidewall; and
    a microsphere with a spherical outer surface, the microsphere positioned within the cavity section such that the outer surface contacts a portion of the first sidewall and a portion of the second sidewall,
    wherein a portion of light coupled into the first section of the waveguide is coupled into the microsphere where the microsphere contacts the waveguide.

12. The microresonator structure of claim 11, wherein the inner surface of the first sidewall has a conical shape.

13. The microresonator structure of claim 11, wherein the inner surface of the first sidewall has an outwardly curved shape.

14. The microresonator structure of claim 11, wherein the first optical fiber is a multi-mode fiber.

15. The microresonator structure of claim 11, wherein the first optical fiber is fusion spliced to the capillary.

16. The microresonator structure of claim 11, wherein the waveguide includes a second optical fiber coupled to the capillary adjacent to the second cavity.

17. The microresonator structure of claim 16, wherein the second optical fiber is solder sealed to the capillary.

18. A method of forming a microresonator structure, the method comprising the steps of:
    coupling a first end of a hollow cylindrical capillary to a first optical fiber;
    forming an inwardly tapering inner surface of a sidewall of the capillary, wherein the inner surface defines a portion of a hollow cavity;
    placing a microsphere in the cavity so that the microsphere contacts the inner surface;
    sealing a second end of the capillary with a second optical fiber; and
    reducing the thickness of the sidewall of the capillary.

19. The method of claim 18, further comprising the step of removing the second optical fiber.

20. The method of claim 18, wherein the capillary is coupled to the first optical fiber by fusion splicing.

* * * * *